United States Patent [19]

DeMario et al.

[11] Patent Number: 5,057,272
[45] Date of Patent: Oct. 15, 1991

[54] NUCLEAR FUEL ASSEMBLY TOP NOZZLE WITH IMPROVED ARRANGEMENT OF HOLD-DOWN LEAF SPRING ASSEMBLIES

[75] Inventors: Edmund E. DeMario; Charles N. Lawson, both of Columbia, S.C.

[73] Assignee: Westinghouse Electric Corp., Pittsburgh, Pa.

[21] Appl. No.: 444,656

[22] Filed: Dec. 1, 1989

[51] Int. Cl.$^5$ ............................................. G21C 3/32
[52] U.S. Cl. .................................. 376/446; 376/285; 376/364; 376/434; 376/445
[58] Field of Search ............... 376/446, 285, 364, 434, 376/445

[56] References Cited

U.S. PATENT DOCUMENTS

| | | | |
|---|---|---|---|
| 4,323,428 | 4/1982 | Schallenberger et al. | 376/353 |
| 4,645,642 | 2/1987 | Leclercq et al. | 376/364 |
| 4,671,924 | 6/1987 | Gjertsen et al. | 376/285 |
| 4,684,502 | 8/1987 | Wilson et al. | 376/446 |
| 4,729,868 | 3/1988 | Gillett et al. | 376/285 |
| 4,792,429 | 12/1988 | Hatfield | 376/446 |
| 4,793,965 | 12/1988 | Altman et al. | 376/353 |
| 4,938,919 | 7/1990 | Rylatt | 376/446 |

FOREIGN PATENT DOCUMENTS 62-91891 10/1985 Japan .
62-102186 10/1985 Japan .

Primary Examiner—Donald P. Walsh
Assistant Examiner—Meena Chelliah

[57] ABSTRACT

A fuel assembly has a top nozzle which includes a lower adapter plate and a plurality of guide structures thereon. The lower plate has a periphery bounding an interior thereof mounted by guide thimbles. The guide structures are attached to and extend along the periphery of lower plate and upwardly therefrom. The top nozzle also includes upper hold-down plate and a plurality of leaf spring assemblies. The upper plate is mounted to the guide structures for slidable movement relative thereto such that the upper plate can move toward and away from the interior of the lower plate within the space bounded by the guide structures as the upper plate slidably moves along the guide structures. The leaf spring assemblies are interposed between and engaged with the lower and upper plates so as to yieldably support the upper plate in spaced relation above the lower plate and bias the upper plate for movement away from the lower plate. The leaf spring assemblies are provided in a non-peripheral arrangement relative to the periphery of the lower plate in which the assemblies cross the interior of the lower plate in a diagonal fashion between adjacent ones of the guide structures.

19 Claims, 5 Drawing Sheets

NUCLEAR FUEL ASSEMBLY TOP NOZZLE WITH IMPROVED ARRANGEMENT OF HOLD-DOWN LEAF SPRING ASSEMBLIES

CROSS-REFERENCE TO RELATED APPLICATION

Reference is hereby made to the following copending U.S. patent application dealing with related subject matter and assigned to the assignee of the present invention: "Improved Hold-Down Spring Clamps On Fuel Assembly Top Nozzle And Method Of Installing Hold-Down Springs " by John A. Rylatt, assigned U.S. Ser. No. 319,590 and filed Mar. 6, 1989. (W.E. 54,904)

BACKGROUND OF THE INVENTION

1. Field of the Invention

The present invention relates generally to fuel assemblies for a nuclear reactor and, more particularly, is concerned with an improved top nozzle for a fuel assembly incorporating a non-peripheral diagonal arrangement of leaf spring assemblies.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle.

In the conventional fuel assembly, coolant flowing upward past the fuel rods and guide thimbles induces significant upward forces. These forces are countered by a combination of the weight of the fuel assembly and a resiliently yieldable hold-down device of the top nozzle which pushes against the upper core plate of the reactor. The hold-down device thereby provides a downward force which counteracts and prevents the force of the upward coolant flow from lifting the fuel assembly into damaging contact with the upper core plate, while allowing for changes in fuel assembly length due to core induced thermal expansion and the like.

One prior art hold-down device employs a single large diameter helical coil spring centrally in the top nozzle to hold down the fuel assembly. The use of a single coil spring in this device presents two principal problems. First, the coil spring has a tendency to fracture and fail due to vibration induced by coolant flow through the fuel assembly. Second, because of its susceptibility to failure, the coil spring cannot withstand the large loads imposed on it when the flow of coolant increases due to activation of the final, or fourth, reactor coolant pump. As a result, the nuclear power plant operator must refrain from activating the last pump until the coolant reaches its start-up temperature of 450°-500° F., when the density of the coolant is less than at a lower temperature. The pumps heat the coolant by putting mechanical energy into it; thus, it takes longer to heat up the coolant if all the pumps cannot be used from the beginning of the critical path (the time it takes to reach operating temperature). The increase in the time spent to heat up the coolant results in considerable increase in operating costs to the plant operator.

It is known heretofore to use a peripheral arrangement of leaf spring assemblies instead of coil springs in a top nozzle hold-down device to provide the necessary hold-down force to prevent lifting of the fuel assembly, while at the same time accommodating thermal expansion of the assembly. U.S. Pat. Nos. 4,671,924 to Gjertsen et al and 4,684,502 to Wilson et al and the above cross-referenced U.S. patent application, assigned to the assignee of the present invention, U.S. Pat. No. 4,792,429 to Hatfield, and Japanese patent document Nos. 62-102186 and 62-91891 all disclose peripheral arrangements of leaf spring assemblies. Particularly, in the Gjertsen et al and Wilson et al patents, the leaf spring assemblies are aligned along and engaged between opposing peripheries of the upper hold-down plate and lower adapter plate of the top nozzle. These peripheral arrangements of leaf spring assemblies are undoubtedly satisfactory for the particular design of the top nozzle structure with which they are used. However, use of a peripheral arrangement of leaf spring assemblies to replace the single central coil spring of the one prior art hold-down device described above would not solve the above-cited problems without a substantial redesign of the overall top nozzle structure.

Consequently, a need exists for an alternative arrangement of leaf spring assemblies to replace the central coil spring and overcome the problems associated with it without requiring a significant modification of the overall top nozzle structure.

SUMMARY OF THE INVENTION

The present invention provides an improved arrangement of hold-down leaf spring assemblies designed to satisfy the aforementioned needs. The central coil spring of the prior art top nozzle is advantageously replaced by a non-peripheral, diagonal arrangement of leaf spring assemblies in the present invention. Leaf spring assemblies in this improved arrangement require only minimal modification of the overall top nozzle structure.

The leaf spring assemblies in the arrangement of the present invention can withstand greater strain than the single coil spring and are not susceptible to failure caused by flow-induced vibration. The plant operator can now activate the fourth coolant pump for operation at higher coolant density and thus at lower coolant temperatures, for example, 300° F. As a result, the plant can decrease its critical path time and begin to generate power approximately two hours earlier than can be done heretofore. This translates to an estimated savings of tens of thousands of dollars for the plant operator.

Accordingly, the present invention is directed to an improved arrangement of leaf spring assemblies in a fuel assembly top nozzle. The top nozzle is useful in a fuel assembly having a plurality of guide thimbles for mounting the top nozzle. The top nozzle comprises: (a) a lower adapter plate having a periphery bounding an interior thereof mountable to the guide thimbles; (b) a plurality of guide structures attached to and extending along the periphery of the lower plate and upwardly therefrom; (c) an upper hold-down plate mounted to the guide structures for slidable movement relative thereto such that the upper plate can move toward and away from the interior of the lower plate within the space bounded by the guide structures as the upper plate slidably moves along the guide structures; and (d) a plurality of leaf spring assemblies interposed between and engaged with the lower and upper plates so as to yieldably support the upper plate in spaced relation above the lower plate and bias the upper plate for movement away from the lower plate. The leaf spring assemblies are provided in a non-peripheral arrangement relative to the periphery of the lower plate in which the assemblies cross the interior of the lower plate in a diagonal fashion between adjacent ones of the guide structures.

More particularly, the upper and lower plates each has a plurality of opposite corners on the peripheries thereon which are non-aligned with one another and instead are laterally offset from one another. The leaf spring assemblies are arranged in single file fashion with each leaf spring assembly extending between each pair of succeeding corners on the periphery of the upper plate. Further, each leaf spring assembly has upper and lower ends and is attached at its lower end to the periphery of the lower plate adjacent one of the guide structures and below one of the corners of the upper plate. The leaf spring assembly is coupled at its upper end to the upper plate adjacent a next one of the corners on the upper plate periphery. Also, the top nozzle includes a plurality of guide means in the form of grooves defined in an underside of the upper plate at the corners thereof for coupling with the upper ends of the leaf spring assemblies.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
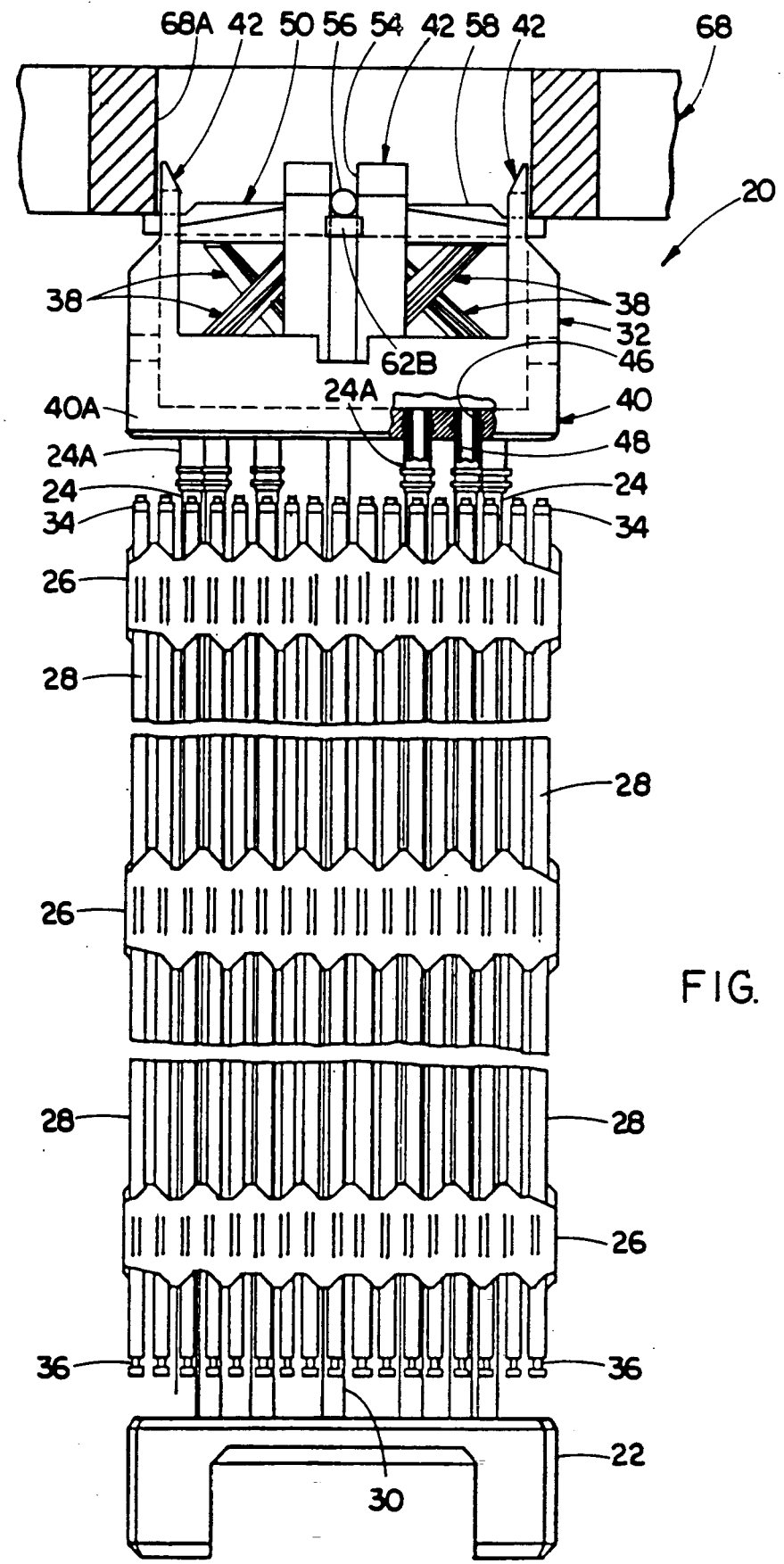
FIG. 1 is an elevational view, partly in section, of a fuel assembly in which the non-peripheral diagonal arrangement of leaf spring assemblies of the present invention is employed, the fuel assembly being illustrated in vertically foreshortened form with parts broken away for clarity.
Figure 3:
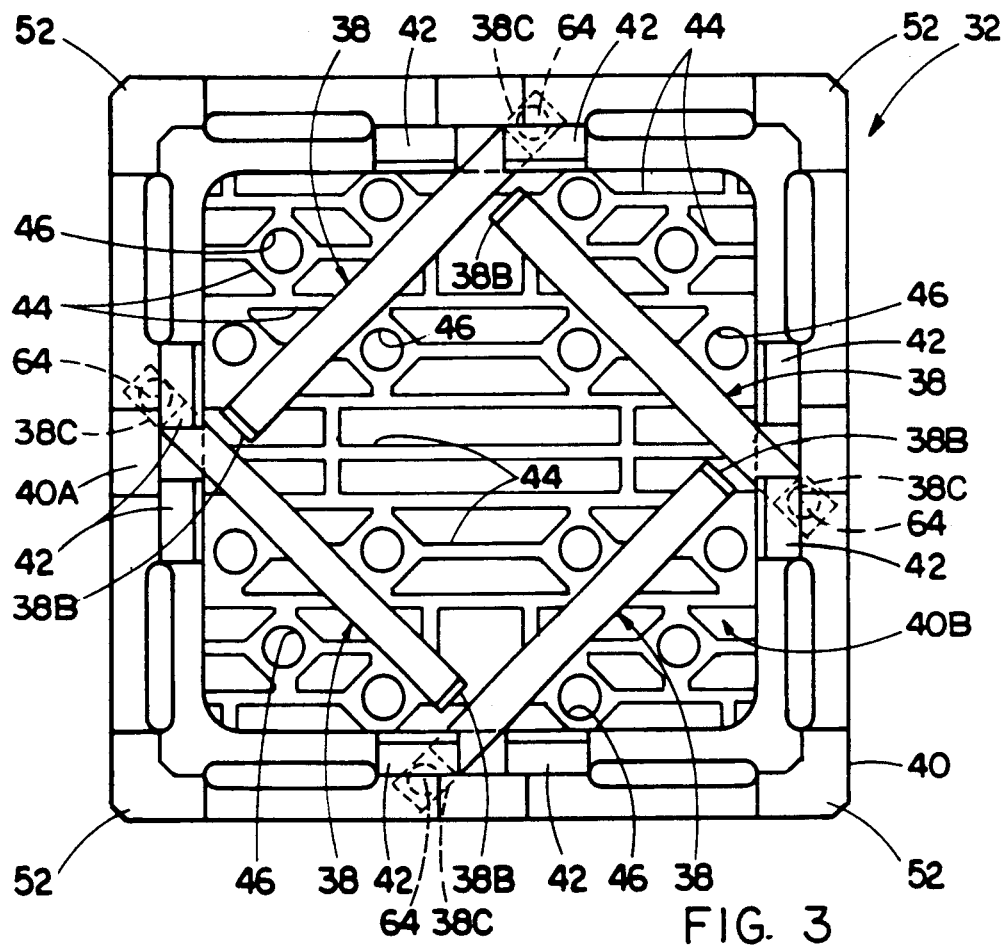
FIG. 3 is a top plan view of the top nozzle as seen along line 3—3 of FIG. 2, showing the non-peripheral diagonal arrangement of leaf spring assemblies incorporated therein.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a fuel assembly, represented in vertically or longitudinally foreshortened form and being generally designated by the numeral 20. The fuel assembly 20 basically includes a lower end structure or bottom nozzle 22 for supporting the assembly on the lower core plate (not shown) in the core region of a reactor (not shown), and a number of longitudinally extending guide tubes or thimbles 24 which project upwardly from the bottom nozzle 22. The assembly 20 further includes a plurality of transverse grids 26 axially spaced along the guide thimbles 24 and an organized array of elongated fuel rods 28 transversely spaced and supported by the grids 26. Also, the assembly 20 has an instrumentation tube 30 located in the center thereof and an upper end structure or top nozzle 32 attached to the upper ends of the guide thimbles 24 which incorporate certain improvements in accordance with the present invention which will be fully described below. With such an arrangement of parts, the fuel assembly 20 forms an integral unit capable of being conventionally handles without damaging the assembly parts.

As mentioned above, the fuel rods 28 in the array thereof in the assembly 20 are held in spaced relationship with one another by the grids 26 spaced along the fuel assembly length. Each fuel rod 28 includes nuclear fuel pellets (not shown) and is closed at its opposite ends by upper and lower end plugs 34, 36 to hermetically seal the rod. The fuel pellets composed of fissile material are responsible for creating the reactive power of the reactor. A liquid moderator/coolant such as water, or water containing boron, is pumped upwardly through the guide thimbles 24 and along the fuel rods 28 of the fuel assembly in order to extract heat generated therein for the production of useful work.

To control the fission process, a number of control rods (not shown) are reciprocally movable in the guide thimbles 24 located at predetermined positions in the fuel assembly 20. Since the control rods are inserted into the guide thimbles 24 from the top of the fuel assembly 20, the placement of the components forming the top nozzle 32 must accommodate the movement of the control rods into the guide thimbles 24 from above the top nozzle.

TOP NOZZLE WITH IMPROVED ARRANGEMENT OF LEAF SPRING ASSEMBLIES

Figure 2:
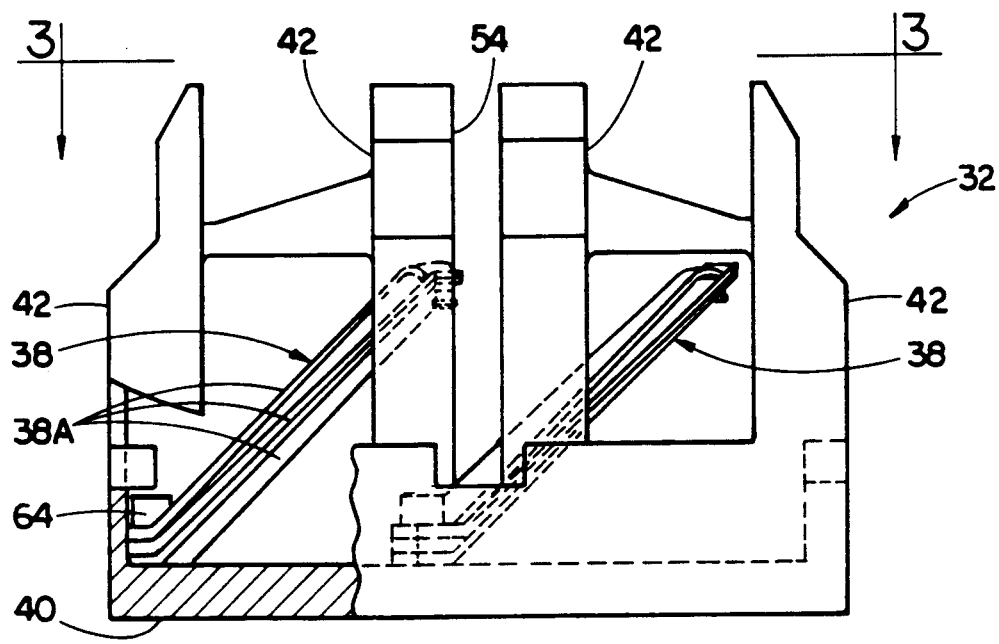
FIG. 2 is an enlarged view of the top nozzle of FIG. 1 removed from the fuel assembly and an upper hold-down plate of the top nozzle omitted.
Figure 8:
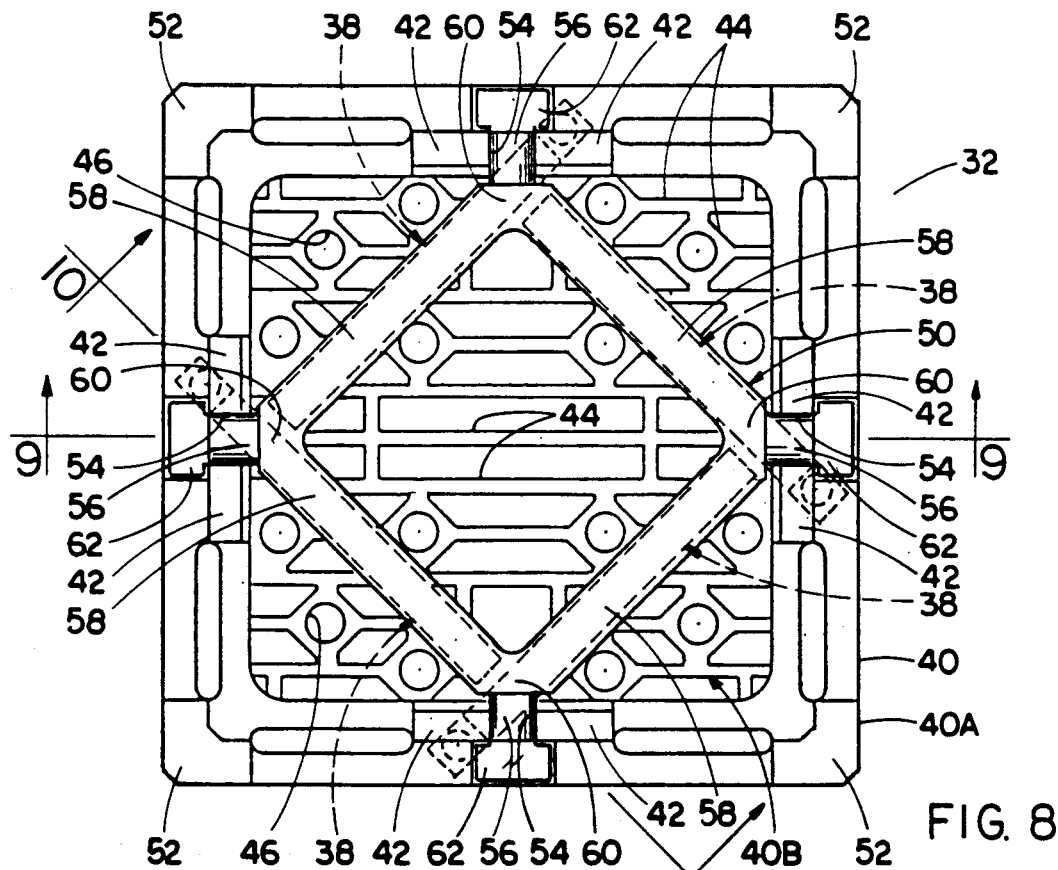
FIG. 8 is a view similar to that of FIG. 3 but with the upper plate included in the top nozzle.
Figure 9:
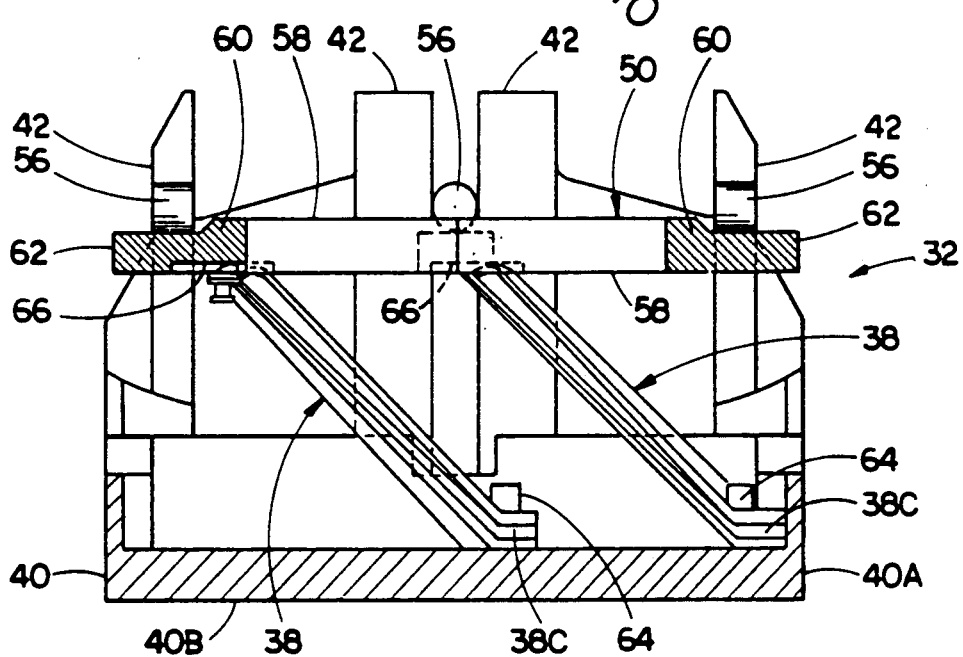
FIG. 9 is a cross-sectional view of the top nozzle taken along line 9—9 of FIG. 8.

Referring now to FIGS. 2, 8 and 9, as well as FIG. 1, there is shown the preferred construction of the top nozzle 32 which incorporates the improved arrangement of leaf spring assemblies 38 in accordance with the present invention. In its basic components, the top nozzle 32 includes a lower adapter plate 40 and a plurality of guide structures 42 attached to and extending along and upwardly from the periphery 40A of the lower plate 40. The periphery 40A of the lower plate 40 bounds an interior 40B of the lower plate having coolant flow openings 44 defined therein and also attachment openings 46 formed therein. The attachment openings 46 receive the upper end portions 24A of the guide thimbles 24 through which can extend the control rods (not shown) mentioned above. Preferably, as seen in FIG. 1, the top nozzle 32 is reconstitutable by the use of removable locking tubes 48 to detachably attach the upper adapter plate 40 to the upper end portions 24A of the guide thimbles 24.

Referring also to FIGS. 4–7, in addition to the leaf spring assemblies 38, lower adapter plate 40 and guide structures 42, the top nozzle 32 also includes an upper retainer or hold-down plate 50 mounted to the upstanding guide structures 42 for slidable movement relative thereto. The upper plate 50 is also movable in rectilinear fashion within the space bounded by the guide structures 42 above the lower adapter plate 40 toward and away from the interior 40B of the lower plate 40 as it moves along the guide structures 42. The leaf spring assemblies 38 incorporated by the top nozzle 32 are interposed between and engaged with the lower adapter plate 40 and upper hold-down plate 50 so as to yieldably support the upper plate 50 in spaced relation above the lower plate 40 and bias the upper plate 50 for movement away from the lower plate 40. The leaf spring assemblies 38 are provided in a unique non-peripheral arrangement relative to the periphery 40A of the lower adapter plate 40. In such an arrangement, the leaf spring assemblies 38 cross the interior 40B of the lower plate 40 in a diagonal-like, but non-intersecting, fashion between adjacent ones of the guide structures 42.

More particularly, the lower adapter plate 40 of the top nozzle 32 is generally rectangular-shaped and has corners 52 displaced approximately ninety degrees from one another with portions of the periphery 40A of the lower plate 40 extending between and interconnecting the corners 52. The guide structures 42 are attached to and extend upwardly from the portions of the lower plate periphery 40A extending between the lower plate corners 52 and thus are spaced substantially ninety degrees from one another also. The guide structures 42 respectively define vertically-extending slots 54. Closure means or stops 56, such as in the form of pins, are disposed in the upper ends of the slots 54 and fixed, such as by being welded, to the respective guide structure portions defining the slots.

Figure 4:
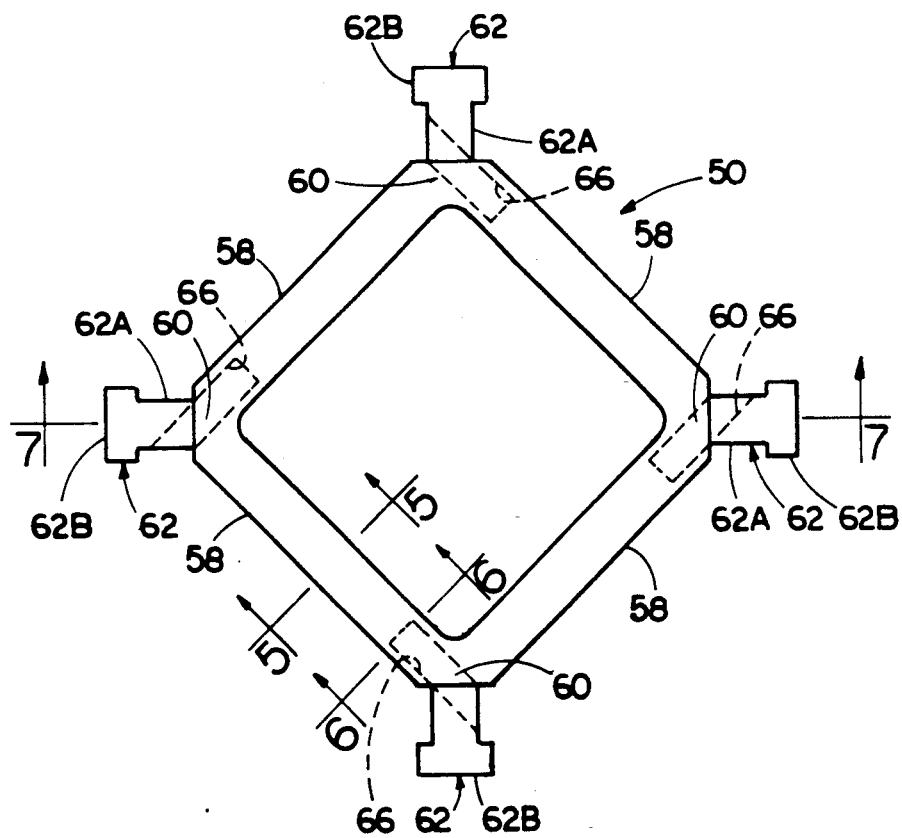
FIG. 4 is an enlarged top plan view of the upper hold-down plate of the top nozzle of FIG. 1 by itself.
Figure 5:
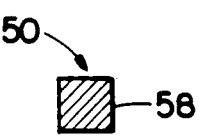
FIG. 5 is a cross-sectional view of the upper plate taken along line 5—5 of FIG. 4.
Figure 6:
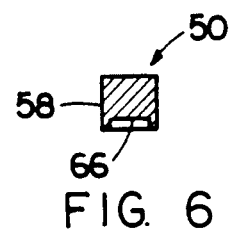
FIG. 6 is another cross-sectional view of the upper plate taken along line 6—6 of FIG. 4.
Figure 7:
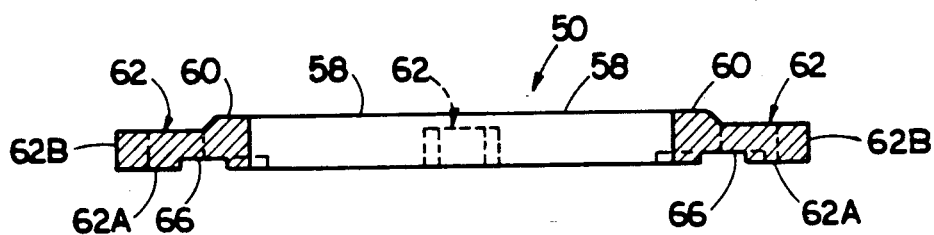
FIG. 7 is still another cross-sectional view of the upper plate taken along line 7—7 of FIG. 4.

The upper hold-down plate 50 of the top nozzle 32 is a generally rectangular- or diamond-shaped ring-like structure and composed of a plurality of generally linearly-extending ligaments 58 being rigidly interconnected at opposite ends to define a plurality of corners 60. The upper plate 50 also includes a plurality of extension tabs 62 attached to the corners 60 thereof and extending outwardly therefrom and within the plane of the ligaments 58. The extension tabs 62 on the upper plate corners 60 extend through the respective slots 56 of the guide structures 42 and slidably move vertically therealong as the upper plate 50 is moved toward and away from the lower plate interior 40B. As best shown in FIGS. 4 and 8, inner portions 62A of the extension tabs 62 which extend through the slots 54 are smaller in width than outer end portions 62B thereof which are located along the exterior of the guide structures 42. Thus, the reduced width inner portions 62A of the tabs 62 slide within the slots 54. The pin-like stops 56 fixed across and thus closing the upper ends of the slots 54 limit the extent of upward movement of the extension tabs 62 along the slots 54 and thereby prevent disassembly of the upper hold-down plate 50 from the guide structures 42. The manner in which the upper plate 50 mounts to the guide structures 42 and fits within the space bounded by the guide structures 42 displaces the ligaments 58 of the upper plate 50 from the respective corners 52 of the lower plate 40 such that the ligaments 58 extend across the interior 40B of the lower plate 40 more or less diagonally and between adjacent ones of the guide structures 42. Thus, the corners 60 on the periphery of the upper plate 50 are not vertically aligned with the corners 52 on the periphery 40A of the lower plate 40; instead, the respective sets of corners 60, 52 are laterally offset or spaced from each other.

Figure 10:
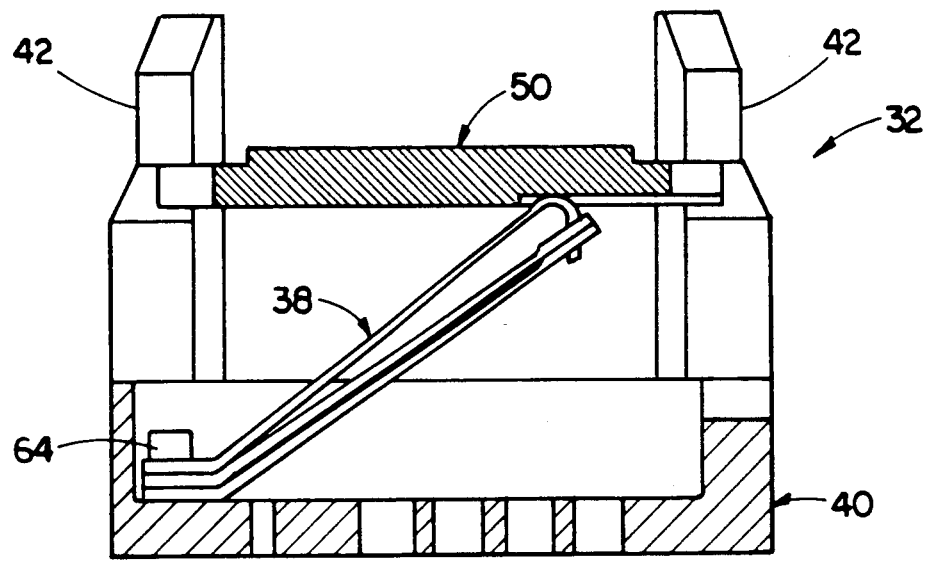
FIG. 10 is another cross-sectional view of the top nozzle taken along line 10—10 of FIG. 8, showing the leaf spring assemblies in an expanded condition.
Figure 11:
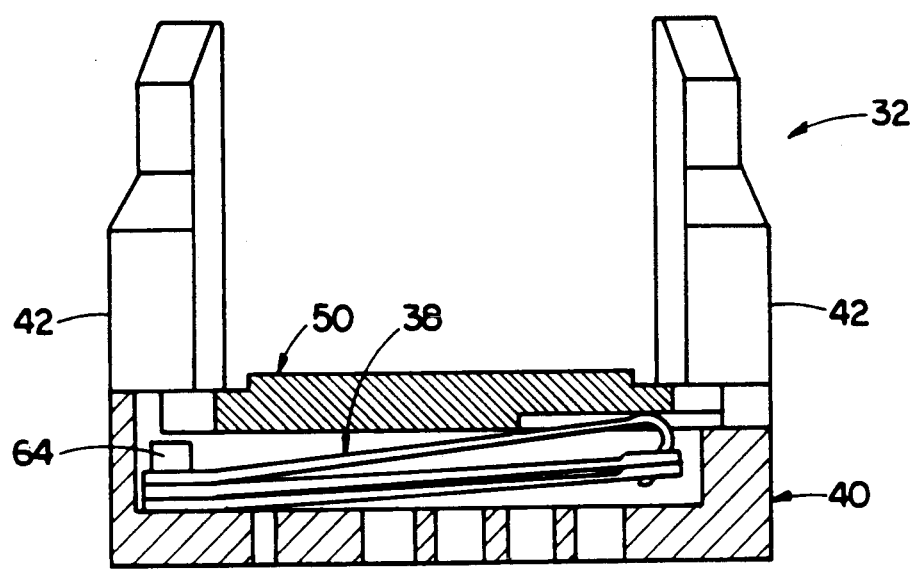
FIG. 11 is a view similar to that of FIG. 10, but showing the leaf spring assemblies in a compressed condition.

Each leaf spring assembly 38 includes, preferably, a plurality of individual leaf springs 38A therein which are disposed in stacked relation. Each leaf spring assembly 38 has upper and lower ends 38B, 38C and is attached at its lower end 38C by a fastener 64, such as a threaded bolt, to the periphery 40A of the lower adapter plate 40 adjacent one of the guide structures 42 and below one of the corner 60 on the upper hold-down plate 50. Each leaf spring assembly 38 is movably coupled at its upper end 38B to the upper plate 50 adjacent the next one of the corners 60 on the upper plate periphery. When in its extended condition, as seen in FIG. 10, each leaf spring assembly 38 extends in inclined fashion between the pairs of adjacent corners 60 of the upper plate 50 and in alignment with the one of the ligaments 58 of the upper plate 50 extending between the adjacent corners 60. Guide means in the form of recesses or grooves 66 are defined in the underside of the upper plate 50 at the corners 60 thereof for coupling with the upper ends 38B of the leaf spring assemblies 38 so as to prevent lateral swinging of the assemblies 38 from under the upper plate 50. FIGS. 10 and 11 depict the leaf spring assemblies 38 in their respective maximum expanded and compressed conditions.

It will be readily observed that the leaf spring assemblies 38 are also arranged in a single file, non-intersecting fashion with each leaf spring assembly 38 extending between each pair of succeeding corners 60 on the periphery of the upper hold-down plate 50. The leaf spring assemblies 38 are arranged along and below the ligaments 58 of the upper plate 50 and engaged with the lower and upper plates 40, 50 so as to bias the upper hold-down plate 50 in an upward direction and thereby impose a hold-down force on the fuel assembly 20 via the lower adapter plate 40 which tends to displace the upper plate 50 to its upper limit along the guide structures 42. As shown in FIG. 1, the upper ends 42A of the guide structures 42 extend within a recess 68A defined in the upper core plate 68 of the nuclear reactor and the force of the leaf spring assemblies 38 biasing the upper hold-down plate 50 away from the lower adapter plate 40 maintains the upper plate 50 at the outer end portions 62B of its extension tabs 62 in engagement with the underside of the upper core plate 68.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A top nozzle for use in a fuel assembly having a plurality of guide thimbles for mounting said top nozzle, said top nozzle comprising:

(a) a lower adapter plate having a periphery bounding an interior thereof mountable to the guide thimbles;

(b) a plurality of guide structures attached to and extending along said periphery of said adapter plate and upwardly therefrom;

(c) an upper hold-down plate mounted to said guide structures for slidable movement relative thereto such that said upper plate can move toward and away from said interior of said lower plate within the space bounded by said guide structures as said upper plate slidably moves along said guide structures; and (d) a plurality of leaf spring assemblies interposed between and engaged with said lower and upper plates so as to yieldably support said upper plate in spaced relation above said lower plate and bias said upper plate for movement away from said lower plate;

(e) said leaf spring assemblies being provided in a non-peripheral arrangement relative to said periphery of said lower plate in which said assemblies cross said interior of said lower plate in a diagonal fashion between adjacent ones of said guide structures.

2. The top nozzle as recited in claim 1, wherein each of said upper and lower plates has a plurality of opposite corners on the peripheries thereof which are non-aligned with one another and instead are laterally offset from one another.

3. The top nozzle as recited in claim 2, wherein each leaf spring assembly has upper and lower ends and is attached at its lower end to said periphery of said lower plate adjacent one of said guide structures and below one of said corners of said upper plate, said each leaf spring assembly being coupled at its upper end to said upper plate adjacent a next one of said corners on said upper plate periphery.

4. The top nozzle as recited in claim 3, further comprising:

a plurality of guide means defined in said upper plate at said corners thereof for coupling with said upper ends of said leaf spring assemblies, each guide means being in the form of a groove defined at said upper plate corner in an underside thereof.

5. The top nozzle as recited in claim 2, wherein said leaf spring assemblies are also arranged in single file fashion with each leaf spring assembly extending between each pair of succeeding corners on said periphery of said upper plate.

6. The top nozzle as recited in claim 1, wherein said lower plate is generally rectangular-shaped having corners displaced approximately ninety degrees from one another and portions of said periphery thereof extending between and interconnecting said corners.

7. The top nozzle as recited in claim 6, wherein said guide structures are attached to and extend along said portions of said lower plate periphery extending said corners thereof, said guide structures extending upwardly from said lower plate and respectively defining substantially vertical-extending slots spaced substantially ninety degrees from one another.

8. The top nozzle as recited in claim 7, wherein said upper plate is generally rectangular-shaped having a plurality of ligaments interconnected at opposite ends to define a plurality of corners and a plurality of extension tabs attached to said corners of said upper plate and extending outwardly therefrom, said ligaments of said upper plate being spaced from said corners of said lower plate and extending across said interior of said lower plate and diagonally between adjacent ones of said guide structures, said extension tabs on said upper plate corners extending through said slots of said guide structures and slidably movable vertically along said slots, said slots being closed at upper ends so as to limit the extent of upward movement of said extension tabs along said slots and thereby prevent disassembly of said upper plate from said guide structures.

9. The top nozzle as recited in claim 8, wherein said leaf spring assemblies are arranged along and below said ligaments of said upper plate and engaged with said lower and upper plates so as to bias said upper hold-down plate in an upward direction and thereby impose a hold-down force on said fuel assembly via said lower plate which tends to displace said upper plate to its upper limit along said guide structures and maintain said upper plate in contact with an upper core plate of a nuclear reactor.

10. The top nozzle as recited in claim 9, wherein said each leaf spring assembly has opposite lower and upper ends and is attached at its lower end to said lower plate adjacent one of said guide structures and generally below one of a pair of adjacent corners of said upper plate, said leaf spring assembly extending between said pair of adjacent corners of said upper plate and in alignment with the one of said ligaments of said upper plate extending between said pair of adjacent corners, said leaf spring assembly being movably coupled at its upper end to said upper plate adjacent to and below the other of said pair of adjacent corners of said upper plate.

11. The top nozzle as recited in claim 1, wherein said each leaf spring assembly includes at least one leaf spring therein.

12. The top nozzle as recited in claim 1, wherein said each leaf spring assembly includes more than one leaf spring therein.

13. The top nozzle as recited in claim 1, wherein said each leaf spring assembly includes more than one leaf spring in a stacked relation therein.

14. A top nozzle for use in a fuel assembly having a plurality of guide thimbles with upper end portions for mounting said top nozzle, said top nozzle comprising:

(a) a generally rectangular-shaped lower adapter plate mountable to the upper end portions of the guide thimbles and having corner portions displaced approximately ninety degrees from one another and peripheral portions extending between and interconnecting said corner portions;

(b) a plurality of guide structures attached to and extending along said peripheral portions of said lower plate between said corner portions thereof, said guide structures extending upwardly from said lower plate and respectively defining substantially vertical-extending slots spaced substantially ninety degrees from one another;

(c) a generally rectangular-shaped upper hold-down plate having a plurality of ligaments interconnected at opposite ends to define a plurality of corners of said upper plate and a plurality of extension tabs attached to said corners of said upper plate and extending outwardly therefrom, said upper plate being mounted to said guide structures for movement toward and away from said lower plate within the space bounded by said guide structures with said ligaments of said upper plate spaced from said corner portions of said lower plate and extending diagonally between adjacent ones of said guide structures and with said extension tabs on said upper plate corners extending through said slots of said guide structures and slidably movable vertically along said slots, said slots at their upper ends being closed so as to limit the extent of upward movement of said extension tabs along said slots and thereby prevent disassembly of said upper hold-down plate from said guide structures; and (d) a plurality of leaf spring assemblies interposed between said lower plate and said ligaments of said upper plate so as to yieldably support said movable upper hold-down plate in spaced relation above said stationary lower adapter plate;

(e) said leaf spring assemblies being arranged along and below said ligaments of said upper plate and engaged with said lower and upper plates so as to bias said upper plate in an upward direction and thereby impose a hold-down force on said fuel assembly via said lower plate which tends to displace said upper plate to its upper limit along said guide structures and maintain said upper plate in contact with an upper core plate of a nuclear reactor;

(f) each of said leaf spring assemblies having opposite lower and upper ends, each leaf spring assembly being attached at its lower end to said lower plate adjacent one of said guide structures and generally below one of a pair of adjacent corners of said upper plate, each leaf spring assembly also extending between said pair of adjacent corners of said upper plate and in alignment with the one of said ligaments of said upper plate extending between said pair of adjacent corners, each leaf spring assembly further being movably coupled at its upper end to said upper plate adjacent to and below the other of said pair of adjacent corners of said upper plate.

15. The top nozzle as recited in claim 14, further comprising:

a plurality of guide means defined in said upper plate at said corners thereof for coupling with said upper ends of said leaf spring assemblies, each guide means being in the form of a groove defined at said upper plate corner in an underside thereof.

16. The top nozzle as recited in claim 14, wherein said leaf spring assemblies are also arranged in single file fashion with each leaf spring assembly extending between each pair of succeeding corners on the periphery of said upper plate.

17. The top nozzle as recited in claim 14, wherein said each leaf spring assembly includes at least one leaf spring therein.

18. The top nozzle as recited in claim 14, wherein said each leaf spring assembly includes more than one leaf spring therein.

19. The top nozzle as recited in claim 14, wherein said each leaf spring assembly includes more than one leaf spring in a stacked relation therein.

* * * * *